April 23, 1935.　　　A. Y. DODGE　　　1,998,659
CLUTCH MECHANISM
Filed Oct. 21, 1929　　　2 Sheets-Sheet 1
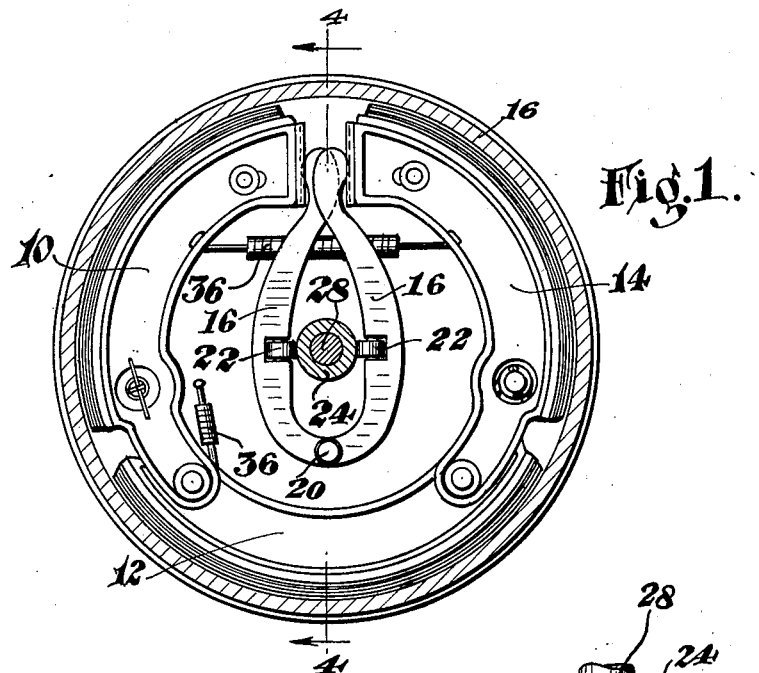
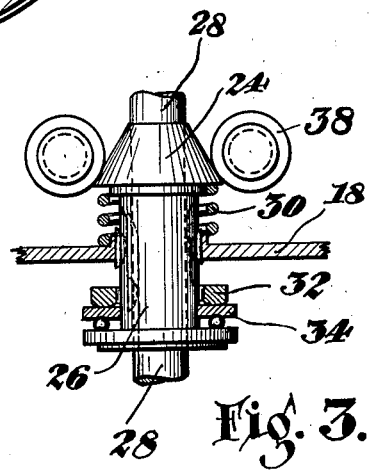
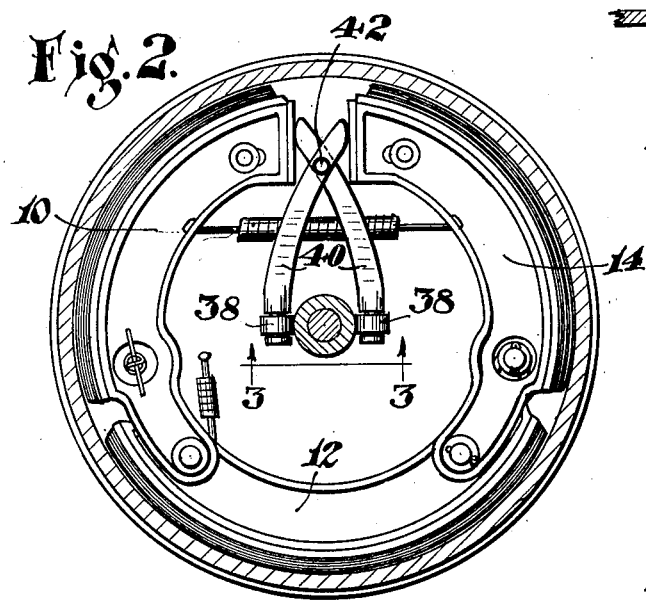
INVENTOR.
Adiel Y. Dodge
BY H. O. Clayton
ATTORNEY.

April 23, 1935.  A. Y. DODGE  1,998,659
CLUTCH MECHANISM
Filed Oct. 21, 1929   2 Sheets-Sheet 2

INVENTOR.
ADIEL Y. DODGE
BY H. Q. Clayton
ATTORNEY

Patented Apr. 23, 1935

1,998,659

UNITED STATES PATENT OFFICE 1,998,659

CLUTCH MECHANISM

Adiel Y. Dodge, South Bend, Ind., assignor to Bendix Brake Company, South Bend, Ind., a corporation of Illinois Application October 21, 1929, Serial No. 401,039

1 Claim. (Cl. 192—78)

This invention relates to friction clutches of the radially expansible type and is illustrated as embodied in an automobile clutch.

An object of the invention is to provide a clutch having exceptionally powerful frictional engagement, preferably obtained by expanding a plurality of friction elements, such as brake shoes, into engagement with a cylindrical surface of the driving element.

An important feature of my invention resides in the provision of a very effective and simple manually controlled clutch release and applying mechanism and in each of the embodiments disclosed in the drawings there is provided a manually operable cone member sleeved over the driven propeller shaft and adapted to contact a lever structure moving the latter with its power multiplying effect to apply the clutch. In one suggested embodiment of the invention there is provided a plurality of pivotally connected levers within the clutch and which levers are contacted by the aforementioned axially movable cone to apply and release the clutch.

Other objects and features of the invention, including novel details of construction and combinations of parts, will become apparent from various embodiments of my invention described and disclosed in the accompanying drawings, in which:

Figure 1 is a side elevation of the friction elements of the clutch proper which are adapted to be actuated by my novel applying and release mechanism;

Figure 2 is a modified form of double lever applying and releasing mechanism;

Figure 4:
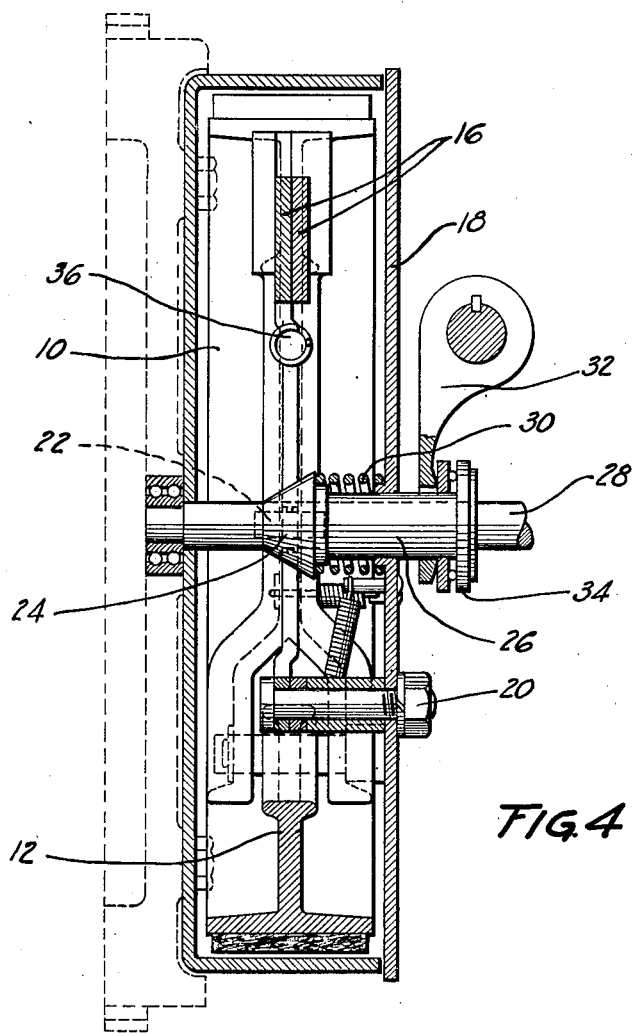

Figure 3 is a view looking in the direction of the arrows 3—3 of Figure 2 showing in detail the remainder of the applying and releasing mechanism partially disclosed in Figures 1 and 2; and Figure 4 is a sectional view disclosing the complete clutch assembly of the clutch of Figure 1 and taken on line 4—4 thereof.

As disclosed in Figure 1, there are provided a plurality of radially expansible friction shoe elements 10, 12 and 14 constructed and arranged as more particularly described and claimed in United States Patent Number 1,746,822 the instant application being a continuation in part thereof.

The present invention resides more particularly in means for effectively applying and releasing the clutch mechanism of Figures 1 and 2, and in the embodiment disclosed in Figures 1 and 4 the end shoes of the clutch are forced apart to engage the driving element by levers 16 pivoted on support 18 at 20 and provided with rollers 22 engaged by a cone 24. The cone forms one end of a sleeve portion 26 keyed to a propeller shaft 28 to rotate therewith and slide thereon. Sleeve 26 is also keyed to the support plate 18 at diametrically opposed points to rotate therewith and slide in and out of the same. A compression spring 30 compressed between the support plate 18 and the edge of the cone 24 functions to thrust the cone into contact with the rollers on the levers to force the same apart and apply the clutch. Support 18 may abut stops on the chassis to retain the support within the flywheel. Release of the clutch is effected by means of a yoke 32 at one end of a manually applied clutch pedal, which yoke contacts with one side of a thrust bearing 34 of the ball bearing type, the latter contacting a flanged end of the slidable sleeve 26.

In operation the clutch spring 30 normally tends to keep the clutch in engagement through the levers 16, but with movement of the clutch release pedal the yoke 32 serves to slide the cone inwardly, further compressing the clutch spring and releasing the levers under the action of clutch springs 36 to thereby release the clutch.

In Figure 2 I have disclosed a slightly modified form of double lever clutch operator in which the cone applying and releasing mechanism of Figure 3 is adapted to contact with rollers 38 on crossed levers 40 having a common fulcrum at 42 intermediate the ends of the end clutch elements 10 and 14. Separation of the levers by the cone serves to force the clutching elements into flywheel engagement.

While but two embodiments of my invention have been described in detail, it is not my intention to limit the invention to those particular embodiments or otherwise than by the terms of the appended claim.

I claim:

Clutch release and applying mechanism comprising in combination with a driving element, a driven element and a support member secured to said driven element, lever members mounted on said support member element, a cone member telescopingly mounted on said driven element, and arranged to contact with said members, a sleeve member extending from said cone member, said sleeve member being keyed to said support member and movable lengthwise with respect to said driven element together with a spring member normally surrounding said sleeve member and compressed between said cone member and said support plate.

ADIEL Y. DODGE.